(12) United States Patent
Thomson et al.

(10) Patent No.: US 11,809,198 B2
(45) Date of Patent: Nov. 7, 2023

(54) HYBRID SKY AND GROUND NAVIGATION FOR MACHINE EMPLOYING SATELLITE POSITIONING

(71) Applicant: Trimble Inc., Sunnyvale, CA (US)

(72) Inventors: Darren Martin Thomson, Christchurch (NZ); Aviad Almagor, Boston, MA (US)

(73) Assignee: Trimble Inc., Sunnyvale, CA (US)

( * ) Notice: Subject to any disclaimer, the term of this patent is extended or adjusted under 35 U.S.C. 154(b) by 152 days.

(21) Appl. No.: 17/316,001

(22) Filed: May 10, 2021

(65) Prior Publication Data
US 2022/0357751 A1  Nov. 10, 2022

(51) Int. Cl.
*G05D 1/00* (2006.01)
*G05D 1/02* (2020.01)
*G06T 7/33* (2017.01)
*G06T 7/70* (2017.01)
*G01S 19/48* (2010.01)

(52) U.S. Cl.
CPC .......... *G05D 1/0278* (2013.01); *G01S 19/485* (2020.05); *G05D 1/0022* (2013.01); *G05D 1/0038* (2013.01); *G05D 1/0234* (2013.01); *G06T 7/33* (2017.01); *G06T 7/70* (2017.01); *G06T 2207/10032* (2013.01); *G06T 2207/30232* (2013.01)

(58) Field of Classification Search
CPC .. G05D 1/0278; G05D 1/0022; G05D 1/0038; G05D 1/0234; G06T 7/33; G06T 7/70; G06T 2207/10032; G06T 2207/30232; G01S 19/485
USPC .......................................................... 701/23
See application file for complete search history.

(56) References Cited

U.S. PATENT DOCUMENTS

| | | | |
|---|---|---|---|
| 2011/0238306 A1* | 9/2011 | Miucic | G01S 5/0284 701/469 |
| 2018/0024250 A1* | 1/2018 | Nishi | G01S 19/23 342/357.62 |
| 2021/0061306 A1* | 3/2021 | Dagan | H04W 4/40 |
| 2021/0372796 A1* | 12/2021 | Lin | G01C 21/20 |

\* cited by examiner

*Primary Examiner* — Tyler J Lee
*Assistant Examiner* — Tiffany P Ohman
(74) *Attorney, Agent, or Firm* — Kilpatrick Townsend & Stockton

(57) ABSTRACT

Disclosed are techniques for navigating a mobile machine, such as an autonomous robot, in an environment that includes objects that may block, reflect, or distort satellite signals to be used for positioning. Satellite data may be captured from one or more satellites. An image may be captured using an imaging device that is at least partially oriented toward the one or more satellites. A set of sky scores may be calculated for a set of ground positions surrounding the mobile machine based on the satellite data and the image. Each of the set of sky scores may be indicative of an accuracy of a satellite-based position at one of the set of ground positions. The mobile machine's navigation may be modified using the set of sky scores.

18 Claims, 13 Drawing Sheets

HYBRID SKY AND GROUND NAVIGATION FOR MACHINE EMPLOYING SATELLITE POSITIONING

An autonomous mobile robotic platform can utilize systems that provide terrain and feature analysis of ground-based information surrounding the robot. This information can facilitate the robot's navigation system to make decisions about where the robot can and cannot go. In some instances, the robot's path planning algorithm can use ground-based information to modify an originally planned path, which may represent the shortest path between a starting location and a destination. For example, images or video captured using a front-facing camera may be used to identify a tree in the robot's path, causing the robot to find a new path around the tree.

In many cases, a mobile robot may utilize a navigation system that relies on satellite-based positioning information. This can allow the robot to determine its current position and to follow pre-planned paths based on world coordinates. To make use of satellite-based positioning, the robot may include a sensor that receives satellite signals. Such a sensor may be referred to as a global navigation satellite system (GNSS) receiver, and compatible satellites may be referred to as GNSS satellites. Examples of currently operational GNSSs include the United States' Global Positioning System (GPS), Russia's Global Navigation Satellite System (GLONASS), China's BeiDou Satellite Navigation System, the European Union's (EU) Galileo, Japan's Quasi-Zenith Satellite System (QZSS), and the Indian Regional Navigation Satellite System (IRNSS).

The accuracy of GNSS-based positioning systems rely on several factors, among which include the availability of multiple GNSS satellites having a line-of-sight (LOS) relationship with the GNSS receiver, as well as the limited presence of multipath interference, which is a significant source of inaccuracy for GNSS-based computations. Multipath interference may be caused by wireless signals reflecting off objects while on their way to the GNSS receiver. Such objects may include mountains, trees, buildings, ground, water, persons, etc. A reflected signal, also referred to as a multipath signal, arrives at the GNSS receiver later than a LOS signal since it has to travel over a greater distance. While reflected signals with large time delays can be filtered out, reflected signals with shorter delays often distort the correlation function shape used for time delay estimation. If reflected signals are strong enough in comparison to the LOS signals, the reflected signals can confuse the GNSS receiver and cause erroneous measurements.

As such, problems can arise when a mobile robot using a satellite- or GNSS-based positioning system is placed in a location with significant multipath interference or a lack of a sufficient number of LOS satellite signals. This can often occur when the robot's view of the sky is obscured by objects that the robot is travelling near or under. Due to their size and complex geometries (e.g., trees, buildings with overhands, elevated solar panels, etc.), these objects are often not detected by the robot's sensors capturing nearby ground-based information. As such, new systems, methods, and other techniques are needed to address these and other issues.

BRIEF SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method comprising: capturing sensor data using one or more machine sensors of a mobile machine, wherein capturing the sensor data includes: capturing satellite data from one or more satellites; and capturing an image using an imaging device that is at least partially oriented toward the one or more satellites; calculating a set of sky scores for a set of ground positions surrounding the mobile machine based on the satellite data and the image, wherein each of the set of sky scores is indicative of an accuracy of a satellite-based position at one of the set of ground positions; and modifying a navigation of the mobile machine using the set of sky scores.

Example 2 is the method of example(s) 1, wherein capturing the sensor data includes: capturing ground data using one or more ground sensors, wherein the one or more machine sensors includes the one or more ground sensors.

Example 3 is the method of example(s) 2, further comprising: calculating a set of ground scores for the set of ground positions, wherein each of the set of ground scores is indicative of an accessibility of one of the set of ground positions for the mobile machine.

Example 4 is the method of example(s) 3, further comprising: forming a navigation map consisting of the set of sky scores and the set of ground scores, wherein the navigation is modified using the navigation map.

Example 5 is the method of example(s) 1-4, wherein each of the set of sky scores is calculated based on a quantity of the one or more satellites that are unobstructed at one of the set of ground positions.

Example 6 is the method of example(s) 1-5, wherein modifying the navigation of the mobile machine includes: causing the mobile machine to move toward a higher score from the set of sky scores and away from a lower score from the set of sky scores.

Example 7 is the method of example(s) 1-6, wherein calculating the set of sky scores includes: calculating one of the set of sky scores for a current position of the set of ground positions; and estimating one of the set of sky scores for each of a plurality of surrounding positions of the set of ground positions.

Example 8 is the method of example(s) 1-7, further comprising: segmenting the image into a plurality of regions based on RF characteristics of objects in the image, wherein the set of sky scores are calculated further based on the segmented image.

Example 9 is a system comprising: one or more processors; and a computer-readable medium comprising instructions that, when executed by one or more processors, cause the one or more processors to perform operations comprising: capturing sensor data using one or more machine sensors of a mobile machine, wherein capturing the sensor data includes: capturing satellite data from one or more satellites; and capturing an image using an imaging device that is at least partially oriented toward the one or more satellites; calculating a set of sky scores for a set of ground positions surrounding the mobile machine based on the satellite data and the image, wherein each of the set of sky scores is indicative of an accuracy of a satellite-based position at one of the set of ground positions; and modifying a navigation of the mobile machine using the set of sky scores.

Example 10 is the system of example(s) 9, wherein capturing the sensor data includes: capturing ground data using one or more ground sensors, wherein the one or more machine sensors includes the one or more ground sensors.

Example 11 is the system of example(s) 10, wherein the operations further comprise: calculating a set of ground scores for the set of ground positions, wherein each of the set of ground scores is indicative of an accessibility of one of the set of ground positions for the mobile machine.

Example 12 is the system of example(s) 11, wherein the operations further comprise: forming a navigation map consisting of the set of sky scores and the set of ground scores, wherein the navigation is modified using the navigation map.

Example 13 is the system of example(s) 9-12, wherein each of the set of sky scores is calculated based on a quantity of the one or more satellites that are unobstructed at one of the set of ground positions.

Example 14 is the system of example(s) 9-13, wherein modifying the navigation of the mobile machine includes: causing the mobile machine to move toward a higher score from the set of sky scores and away from a lower score from the set of sky scores.

Example 15 is the system of example(s) 9-14, wherein calculating the set of sky scores includes: calculating one of the set of sky scores for a current position of the set of ground positions; and estimating one of the set of sky scores for each of a plurality of surrounding positions of the set of ground positions.

Example 16 is the system of example(s) 9-15, wherein the operations further comprise: segmenting the image into a plurality of regions based on RF characteristics of objects in the image, wherein the set of sky scores are calculated further based on the segmented image.

Example 17 is a non-transitory computer-readable medium comprising instructions that, when executed by one or more processors, cause the one or more processors to perform operations comprising: capturing sensor data using one or more machine sensors of a mobile machine, wherein capturing the sensor data includes: capturing satellite data from one or more satellites; and capturing an image using an imaging device that is at least partially oriented toward the one or more satellites; calculating a set of sky scores for a set of ground positions surrounding the mobile machine based on the satellite data and the image, wherein each of the set of sky scores is indicative of an accuracy of a satellite-based position at one of the set of ground positions; and modifying a navigation of the mobile machine using the set of sky scores.

Example 18 is the non-transitory computer-readable medium of example(s) 17, wherein capturing the sensor data includes: capturing ground data using one or more ground sensors, wherein the one or more machine sensors includes the one or more ground sensors.

Example 19 is the non-transitory computer-readable medium of example(s) 18, wherein the operations further comprise: calculating a set of ground scores for the set of ground positions, wherein each of the set of ground scores is indicative of an accessibility of one of the set of ground positions for the mobile machine.

Example 20 is the non-transitory computer-readable medium of example(s) 17-19, wherein modifying the navigation of the mobile machine includes: causing the mobile machine to move toward a higher score from the set of sky scores and away from a lower score from the set of sky scores.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION OF THE INVENTION

Figure 1:
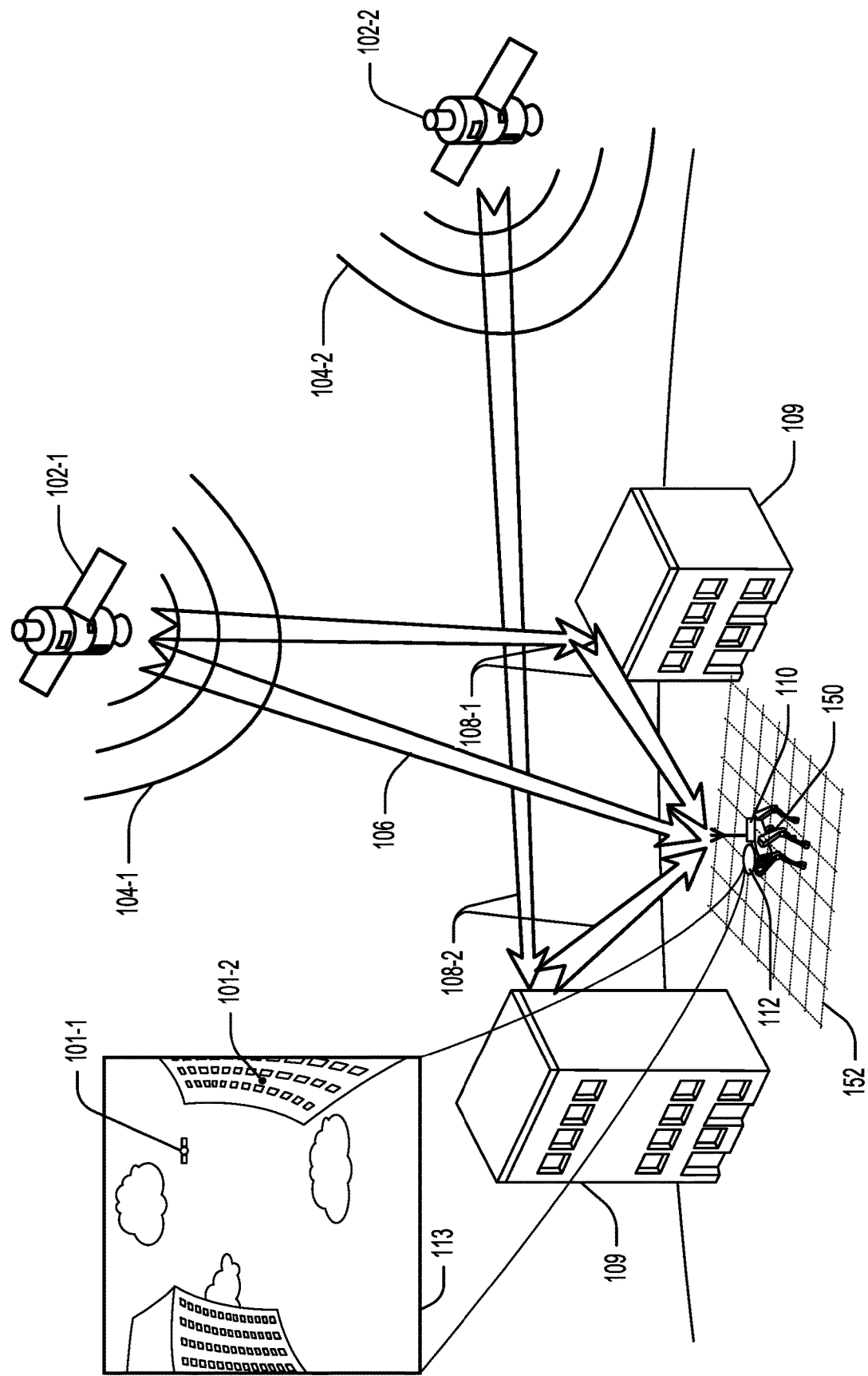
FIG. 1 illustrates an example of a mobile machine navigating within an environment that includes objects that may block, reflect, or distort satellite signals.

Navigation systems employed by autonomous mobile robots can utilize both ground-based information and satellite-based information to generate, follow, and modify a path between start and destination locations. The satellite-based information may be captured using a global navigation satellite system (GNSS) receiver that may be mounted on the robot at a position where light-of-sight (LOS) wireless signals may be received from one or more satellites. Since satellite-based information can be unreliable in locations that exhibit significant multipath interference or that lack a sufficient number of LOS satellite signals, it can be beneficial for the robot to predict where these problematic locations are, modify the robot's path to avoid these locations, and alter the positioning algorithm if the robot is positioned in these locations to rely less on (or ignore completely) satellite-based information in favor of ground-based information.

Embodiments of the present disclosure relate to techniques for handling satellite-based data in navigation systems for mobile machines. As used herein, a mobile machine may refer to a robot (autonomous or non-autonomous), a vehicle, or any machine that can move over a distance, for example, along a path. As used herein, satellite-based data (or simply "satellite data") may refer to any data or other information captured by a sensor, such as a GNSS receiver, from satellite(s) located in the sky above the mobile machine, for example, in low Earth or medium-Earth orbit.

Some embodiments of the present disclosure include a technique of forming a hybrid sky and ground navigation map (or simply "navigation map") and using the navigation map to modify the navigation of the mobile machine. The navigation map may include a set of ground scores related to the accessibility or navigability of the terrain surrounding the mobile machine. For example, positions along the ground that may be difficult for the mobile machine to move through, such as due to an obstacle, such as a tree, a bench, or a curb, may have a low ground score while positions along the ground that are more easily moved through, such as flat ground, may have a high ground score.

The navigation map may further include a set of sky scores related to the accuracy of potentially calculated geospatial positions at the same positions along the ground as the set of ground scores. For example, a sky score for a particular position along the ground (or ground position) may be high if it is determined that the availability of LOS satellites would be high (e.g., greater than three LOS satellites) and/or that multipath interference would be low if the mobile machine were to be positioned at the particular ground position. In contrast, a sky score for a particular ground position may be low if it is determined that the availability of LOS satellites would be low (e.g., less than three LOS satellites) and/or that multipath interference would be high if the mobile machine were to be positioned at the particular ground position.

The navigation map may be formed using the various sensors employed by the mobile machine. For example, the set of ground scores may be calculated using data (referred to as ground data) captured using any sensor (referred to as a ground sensor) that captures data indicative of the physical surface of the ground. Ground sensors may include cameras, depth sensors, acoustic sensors, radar, LiDAR, among other possibilities. The set of sky scores may be calculated using satellite data captured using a GNSS receiver and an image of the sky captured by an upward-facing camera mounted to the mobile machine. The image may be a camera image captured by a camera, a depth image captured by a depth sensor, among other possibilities. The image captured by the upward-facing camera may be referred to as an upward-facing image.

In some examples, a sky score for a particular ground position may be calculated by estimating the quantity of LOS satellites that would be available at the particular ground position. This quantity may be estimated by modeling the environment surrounding the mobile machine using a single or multiple upward-facing images. For example, multiple images can be used to estimate the height of an object based on the distance traveled by the mobile machine between the images being captured and the movement of the object within the images (e.g., number of pixels moved).

Some embodiments described herein allow for selectively processing received satellite signals. For example, each satellite signal that is received can be processed differently based on where in the upward-facing image the corresponding satellite is located. For example, using the satellite's location within the image, it can be determined whether there is a direct visible LOS to the satellite or if it is blocked by an object. This can be accomplished by projecting the orbital positions of the satellites onto the image and determining whether a radio frequency (RF)-blocking object is aligned with the projection. Tracking of a blocked satellite indicates that the pseudorange and carrier phase measurements correspond to reflected signals and should either be ignored or deweighted relative to the LOS signals.

In some implementations, the upward-facing image can be segmented into multiple regions based on the predicted RF characteristics of objects in the image, and the orbital positions of the satellites can be projected onto one of the regions. In one example, the upward-facing image is segmented into three regions: one region having objects that provide little RF obstruction (e.g., clear sky, clouds), one region having objects that provide some RF obstruction (e.g., vegetation, foliage), and one region having objects that provide significant RF obstruction (e.g., buildings, mountains). The segmentation can be performed using a machine-learning model, such as a neural network, or using any one of various image segmentation techniques.

Upon receiving a satellite signal, the GNSS receiver can look up the orbital position of the satellite that transmitted the signal and project the orbital position onto the upward-facing image. The orbital position may be determined based on the satellite signal itself (e.g., extracted from the ephemeris data modulated onto the satellite signal) or may be obtained elsewhere. The pixel location onto which the orbital position is projected is recorded. Next, the pixel location is compared to the segmented regions to determine in which region the pixel location is located. The identified region is associated with the satellite and the corresponding satellite signal. Projecting the orbital positions of the satellites is facilitated by an accurate measurement of the position and orientation of the imaging device and the corresponding upward-facing image.

FIG. 1 illustrates an example of a mobile machine 150 navigating within an environment that includes objects that may block, reflect, or distort satellite signals, in accordance with some embodiments of the present disclosure. In some instances, FIG. 1 may correspond to a scenario in which mobile machine 150 is operating in an environment with multipath interference. Mobile machine 150 may include a GNSS receiver 110 that receives wireless signals 104 that are broadcasted by GNSS satellites 102. Wireless signals 104 may contain pseudo-random-noise (PRN) codes modulated onto carrier frequencies. Broadcasted wireless signals 104 may include both LOS signals 106, i.e., signals transmitted and received without reflection off objects, and reflected signals 108, i.e., signals received by GNSS receiver 110 after reflection off at least one object, such as buildings 109. LOS signals 106 and reflected signals 108 are each received by GNSS receiver 110 via a GNSS antenna while GNSS receiver 110 is attempting to compute its geospatial position.

To navigate through the environment, mobile machine 150 may generate a navigation map 152 that includes sky scores and/or ground scores for multiple ground positions surrounding mobile machine 150. The scores included in navigation map 152 may be defined over a grid, as shown, or over some other spatial distribution (evenly or unevenly spaced). As described herein, navigation map 152 may facilitate mobile machine 150 in generating a path between start and destination locations or modifying a pre-planned path. For example, the sky scores in navigation map 152 may inform mobile machine 150 as to the accuracy of potentially calculated geospatial positions at the ground positions and the ground scores in navigation map 152 may inform mobile machine 150 as to the accessibility or navigability of the terrain at the ground positions.

In many instances, mobile machine 150 may want to distinguish between LOS signals 106 and reflected signals 108 for the purpose of generating sky scores for navigation map 152. For example, the sky scores may be calculated such that a ground position that is able to receive multiple LOS signals 106 and few reflected signals 108 may have a high sky score and a ground position that is able to receive few LOS signals 106 and multiple reflected signals 108 may have a low sky score. In some implementations, the sky scores may be calculated based on LOS signals 106 alone since mobile machine 150 may have the capability of ignoring or deweighting reflected signals 108.

To distinguish between LOS signals 106 and reflected signals 108, mobile machine 150 may capture an image 113 using an imaging device 112 that is at least partially oriented in the upward direction toward GNSS satellites 102. Image 113 may be analyzed and segmented into different regions, and the orbital positions of GNSS satellites 102 may be projected onto image 113. A location 101-1 within image 113 onto which the orbital location of GNSS satellite 102-1 is projected indicates that wireless signals 104-1 at least include LOS signal 106. Based on the proximity of buildings 109, GNSS receiver 110 may also predict that wireless signals 104-1 further includes reflected signal 108-1. A location 101-2 within image 113 onto which the orbital location of GNSS satellite 102-2 is projected indicates that wireless signals 104-2 do not include a LOS signal but instead include reflected signal 108-2.

GNSS receiver 110 may accordingly track wireless signals 104-1 while ignoring wireless signals 104-2, since wireless signals 104-2 only include a reflected signal. In some instances, GNSS receiver 110 may weight wireless signals 104-1 and 104-2 differently while computing its geospatial position. For example, GNSS receiver 110 may process wireless signals 104-1 with a weight value of 1 and wireless signals 104-2 with a weight value of 0.5. GNSS receiver 110 may later modify (decrease) the weight value associated with wireless signals 104-2 when wireless signals from additional GNSS satellites become available and unobstructed by objects.

Figure 2A:
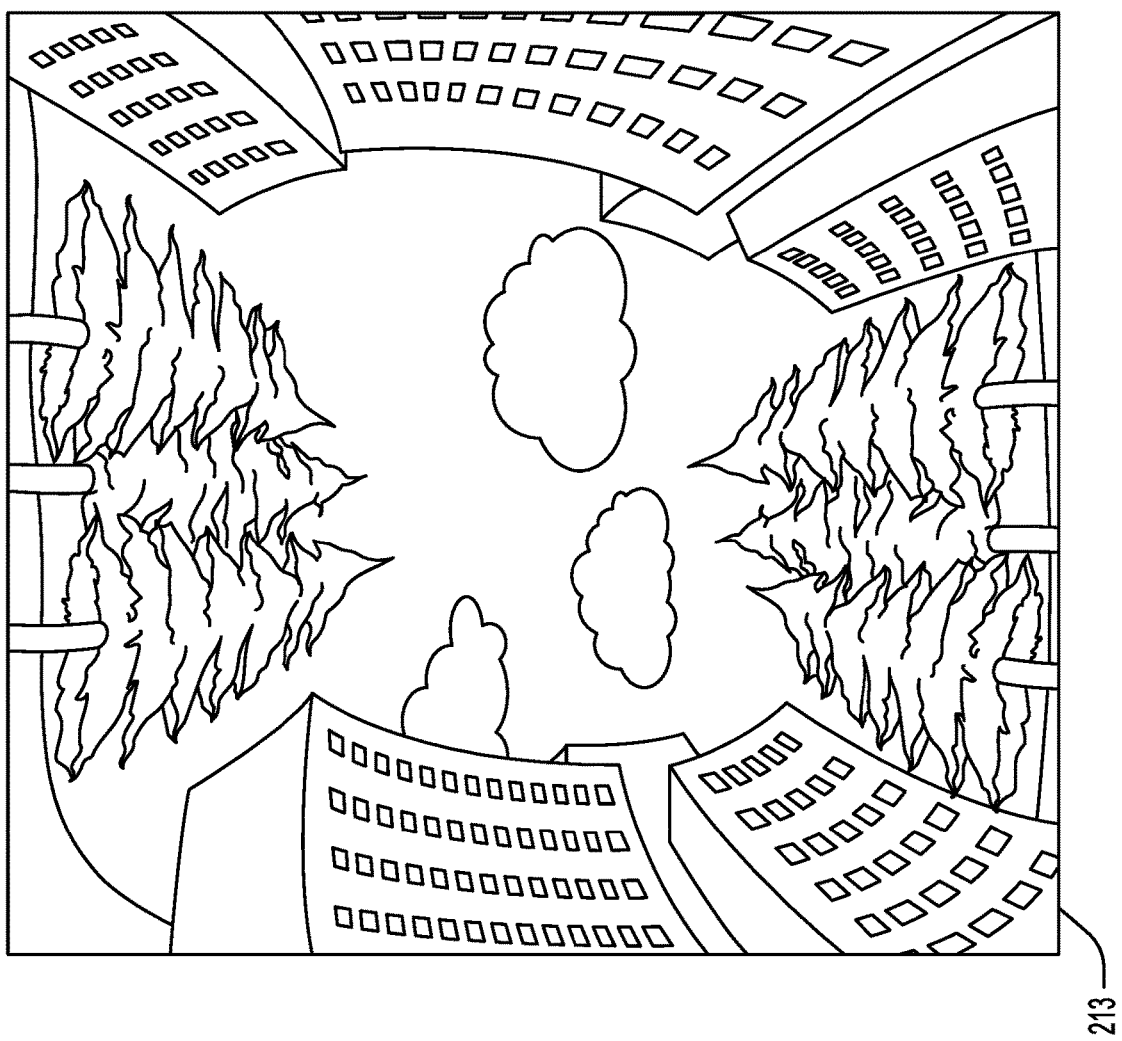
FIG. 2A illustrates an example image captured by an imaging device.

FIG. 2A illustrates an example image 213 captured by an imaging device, in accordance with some embodiments of the present disclosure. Image 213 is an upward-facing image and shows the vertical hemisphere in a setting with buildings, trees, and open sky. In the illustrated example, the imaging device used to capture image 213 includes a wide-angle lens, such as a fisheye lens.

Figure 2B:
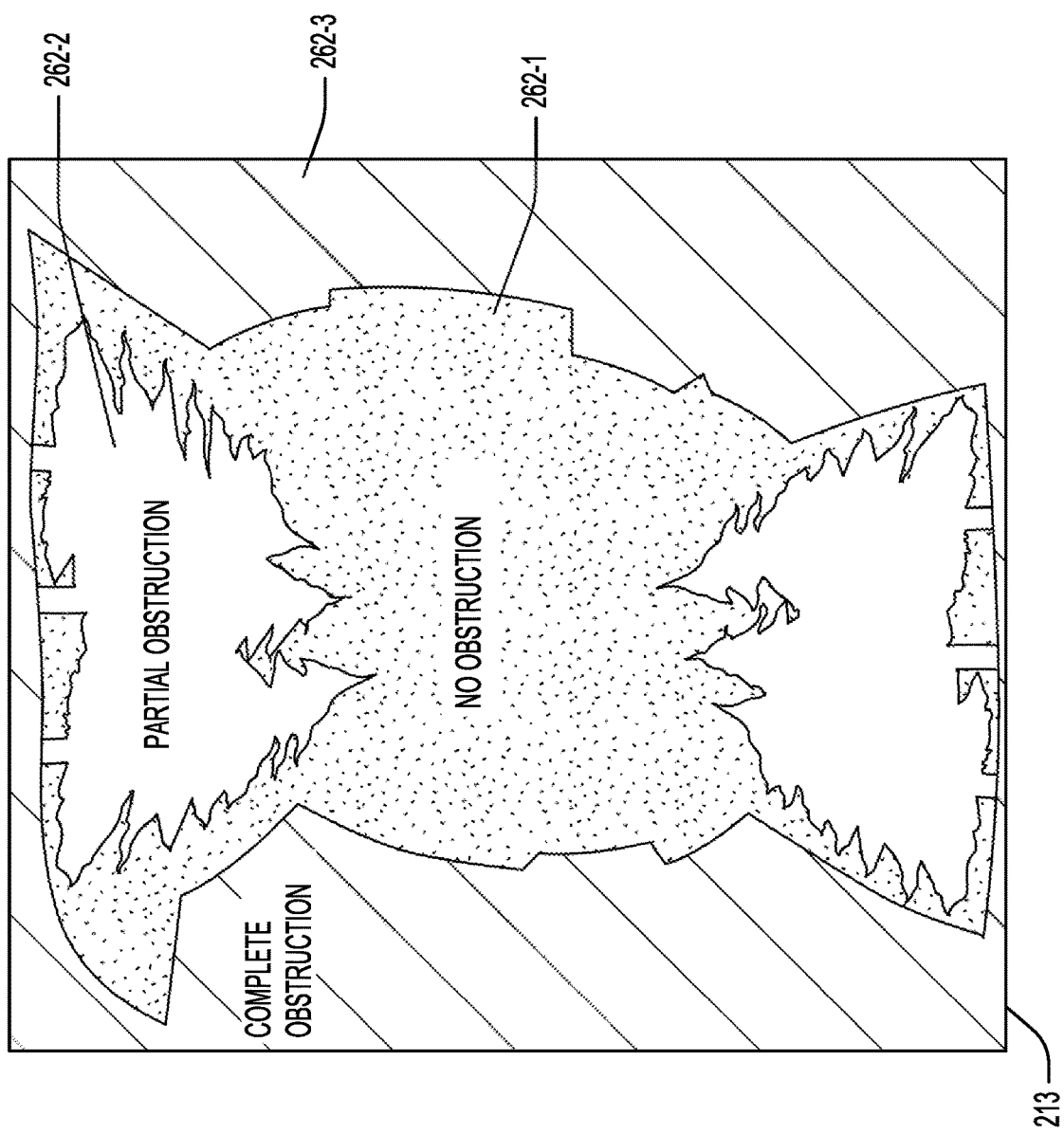
FIG. 2B illustrates an example segmentation of an image into multiple regions.

FIG. 2B illustrates an example segmentation of image 213 into multiple regions 262, in accordance with some embodiments of the present disclosure. Each of regions 262 includes objects with similar RF-blocking characteristics and different regions include objects with dissimilar RF-blocking characteristics. Region 262-1 corresponds to clouds or open sky and includes objects that provide little RF obstruction. Region 262-2 corresponds to vegetation or foliage and includes objects that provide some RF obstruction. Region 262-3 corresponds to buildings and includes objects that provide significant RF obstruction.

Figure 2C:
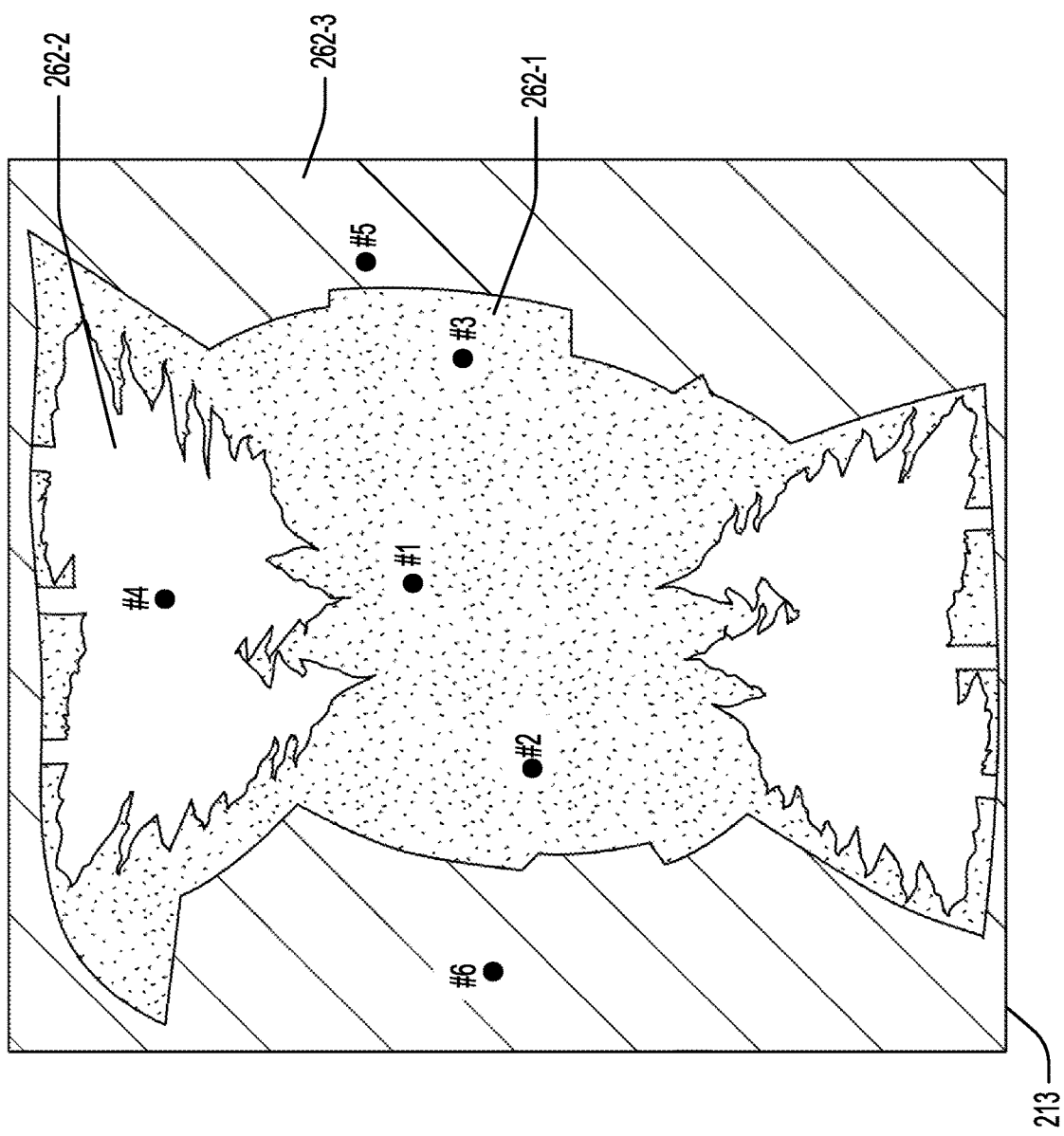
FIG. 2C illustrates an example projection of satellites onto an image.

FIG. 2C illustrates an example projection of GNSS satellites onto image 213, in accordance with some embodiments of the present disclosure. In the illustrated example, a GNSS receiver receives GNSS signals from satellite #1 (indicated in FIG. 2C as "#1"), determines the orbital position of satellite #1, projects satellite #1 onto image 213 by determining the pixel location for satellite #1 based on the position and orientation of image 213 and the orbital position of satellite #1, and region 262-1 is identified as including the pixel location for satellite #1. Similarly, the GNSS receiver receives GNSS signals from satellite #2, determines the orbital position of satellite #2, projects satellite #2 onto image 213 by determining the pixel location for satellite #2 based on the position and orientation of image 213 and the orbital position of satellite #2, and region 262-1 is identified as including the pixel location for satellite #2. Similar steps are performed for each of satellites #3, #4, #5, and #6, except that region 262-2 is identified as including the pixel location for satellite #4 and region 262-3 is identified as including the pixel locations for satellites #5 and #6.

In some embodiments, the received GNSS signals corresponding to satellites #1, #2, and #3 may be determined to be LOS signals, the received GNSS signals corresponding to satellites #5 and #6 may be determined to be reflected signals, and the received GNSS signals corresponding to satellite #4 may be flagged as possibly being either LOS or reflected. The GNSS signals in the three regions may be processed in accordance with their region. For example, a weight table may provide that pseudoranges computed using GNSS signals in region 262-1 may be weighted by a weight of 1, pseudoranges computed using GNSS signals in region 262-2 may be weighted by a weight of 0.5, and pseudoranges computed using GNSS signals in region 262-3 may be weighted by a weight of 0.

In some embodiments, the weight assigned to a satellite may be modified based on the proximity of the satellite's pixel location to a neighboring region. For example, the weight assigned to satellite #3 may be less than the weight assigned to satellite #1 due to the proximity of the pixel location for satellite #3 to region 262-3. As another example, the weight assigned to satellite #5 may be greater than the weight assigned to satellite #6 due to the proximity of the pixel location for satellite #5 to region 262-1. In some instances, the assigned weight may be increased or decreased linearly as a function of distance from the nearest neighboring region, with some minimum threshold distance from the boundary at which the assigned weight begins to be adjusted, e.g., 10 pixels, 50 pixels, 100 pixels, etc.

In some embodiments, the weight table may be modified based on the number of detected satellites. For example, the weight table may be initialized or set to [1, 1, 1] (corresponding to regions 262-1, 262-2, and 262-3, respectively) until a threshold number of satellites (e.g., four or five) is reached. For example, upon receiving GNSS signals from the fourth or fifth satellite, the weight table may be modified from [1, 1, 1] to [1, 0.8, 0.6], thereby deweighting the GNSS signals in regions 262-2 and 262-3. Continuing with the above example, upon receiving GNSS signals from a second threshold number of satellites (e.g., six or seven), the weight table may be modified from [1, 0.8, 0.6] to [1, 0.5, 0], thereby further deweighting the GNSS signals in regions 262-2 and 262-3. Other possibilities of dynamically adjusting the weight table based on the number of detected satellites are contemplated and are considered to be within the scope of the present disclosure.

In some embodiments, a sky score for a ground position may be calculated using image 213 and the identified regions. For example, the sky score may be calculated by a formulation that sums the satellites in image 213 and weights each satellite in accordance with the corresponding region that was identified for the satellite. For example, the sky score may be calculated by summing satellite #1, #2, and #3 and weighting each with a first weight (e.g. 1(1)+1(1)+

1(1)=3), summing satellite #4 and weighting it with a second weight (e.g., 1(0.5)=0.5), summing satellites #5 and #6 and weighting each with a third weight (e.g., 1(0)+1(0)=0), and setting the sky score equal to the total (e.g., 3+0.5+0=3.5).

Figure 3A:
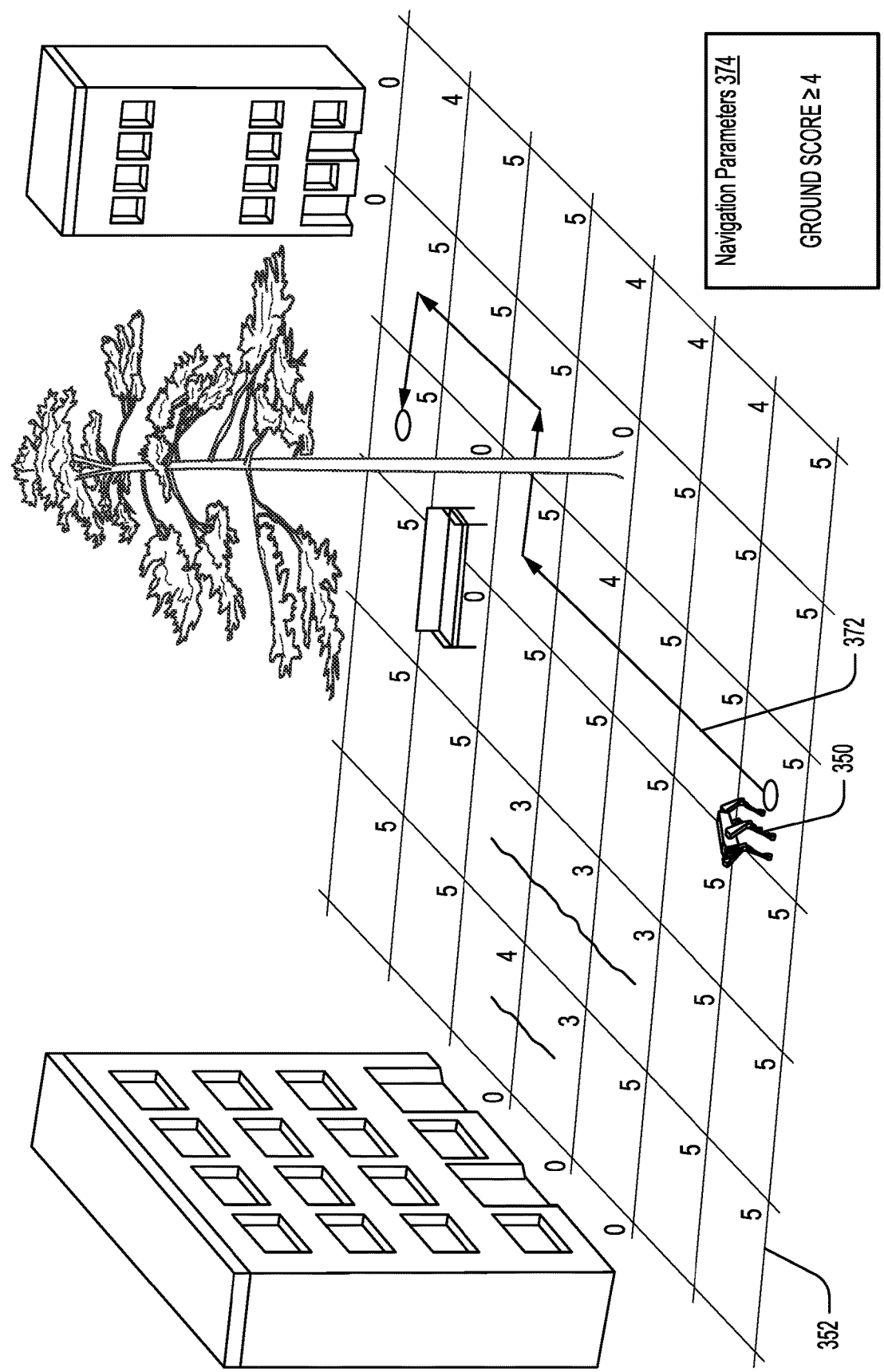
FIG. 3A illustrates an example of a mobile machine navigating between start and destination locations using a navigation map.

FIG. 3A illustrates an example of a mobile machine 350 navigating between start and destination locations using a navigation map 352, in accordance with some embodiments of the present disclosure. In the example of FIG. 3A, navigation map 352 includes a set of ground scores for a set of ground positions. Each of the set of ground scores in navigation map 352 may indicate how accessible a particular ground position is to mobile machine 350. For example, the ground score for ground positions that are relatively flat is equal to 5 while the ground score for impassible ground positions (e.g., due to a tree or building) is equal to 0.

After forming navigation map 352, the navigation system of mobile machine 350 may analyze navigation map 352 to generate a path 372 that connects start and destination locations. In some instances, path 372 may be generated based on navigation parameters 374, which may be generated at mobile machine 350 or received from an external computing system. In the example of FIG. 3A, navigation parameters 374 specify that mobile machine 350 is to generate path 372 such that path 372 only passes through ground positions with ground scores greater than or equal to 4. As such, path 372 is generated such that it passes between the bench and tree as shown. Mobile machine 350 is then caused to follow path 372 until arriving at the destination location. While traveling along path 372, mobile machine 350 may capture new sensor data and update navigation map 352 to reflect the newly captured sensor data. In some instances, path 372 may be modified while mobile machine 350 is traveling along path 372 in response to changes to navigation map 352 or navigation parameters 374.

Figure 3B:
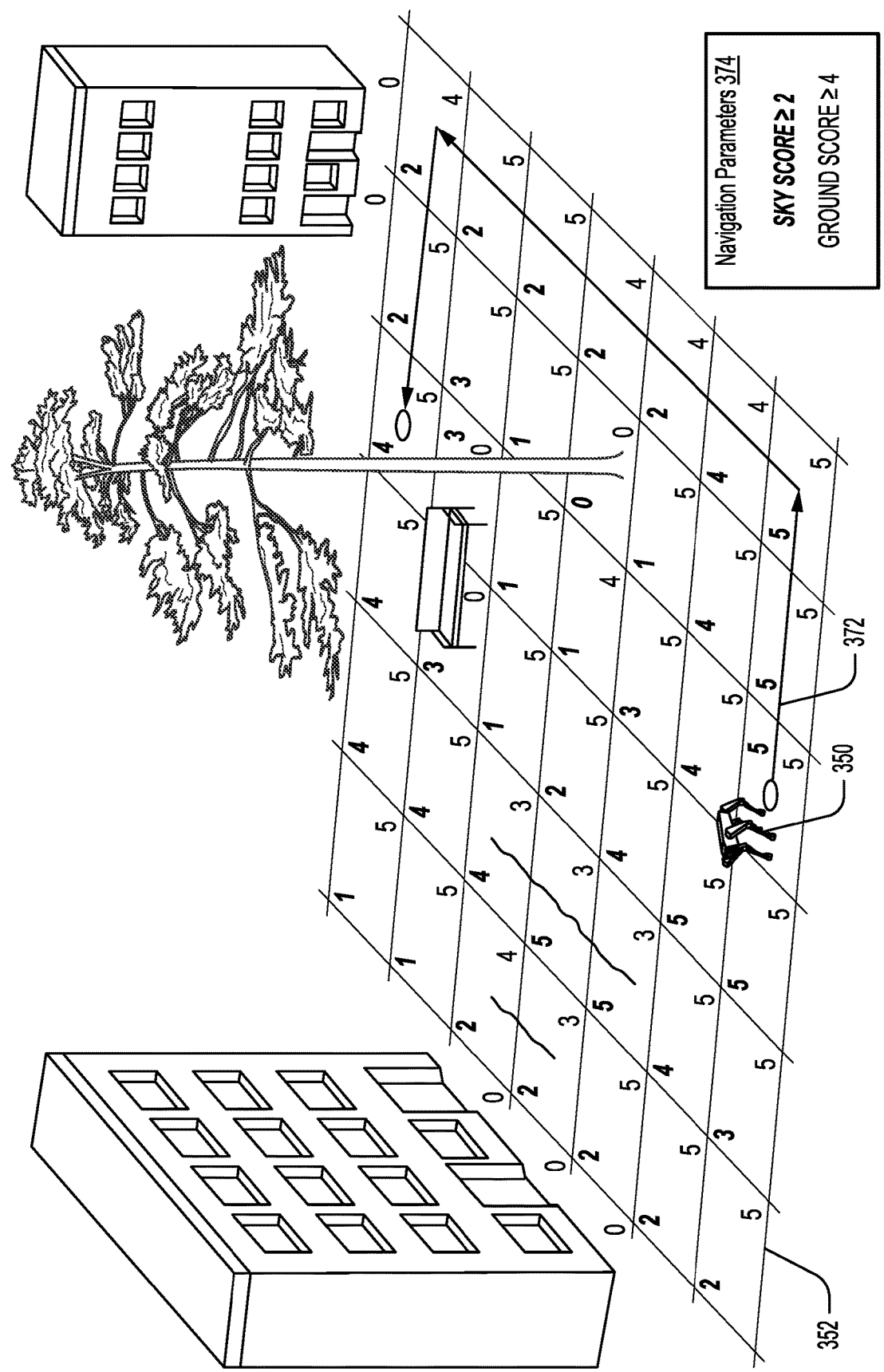
FIG. 3B illustrates an example of a mobile machine navigating between start and destination locations using a navigation map.

FIG. 3B illustrates an additional example of mobile machine 350 navigating between start and destination locations using navigation map 352, in accordance with some embodiments of the present disclosure. In the example of FIG. 3B, navigation map 352 includes a set of sky scores (italicized and bold) and a set of ground scores for a set of ground positions. Each of the set of sky scores in navigation map 352 may indicate how accurate a calculated geospatial position using satellite data would be at a particular ground position. For example, the sky score for ground positions near objects that are large or have significant overhangs (and therefore could potentially obstruct LOS satellites) is equal to 0, 1, or 2 while the sky score for ground positions further away from these objects is equal to 3, 4, or 5.

After forming navigation map 352, the navigation system of mobile machine 350 may analyze navigation map 352 to generate a path 372 that connects start and destination locations. In the example of FIG. 3B, navigation parameters 374 specify that mobile machine 350 is to generate path 372 such that path 372 only passes through ground positions with sky scores greater than or equal to 2 and ground scores greater than or equal to 4. As such, path 372 is generated such that it goes around the right side of the tree as shown. Mobile machine 350 is then caused to follow path 372 until arriving at the destination location. While traveling along path 372, mobile machine 350 may capture new sensor data and update navigation map 352 (sky scores and/or ground scores) to reflect the newly captured sensor data. In some instances, path 372 may be modified while mobile machine 350 is traveling along path 372 in response to changes to navigation map 352 (sky scores and/or ground scores) or navigation parameters 374.

Figure 3C:
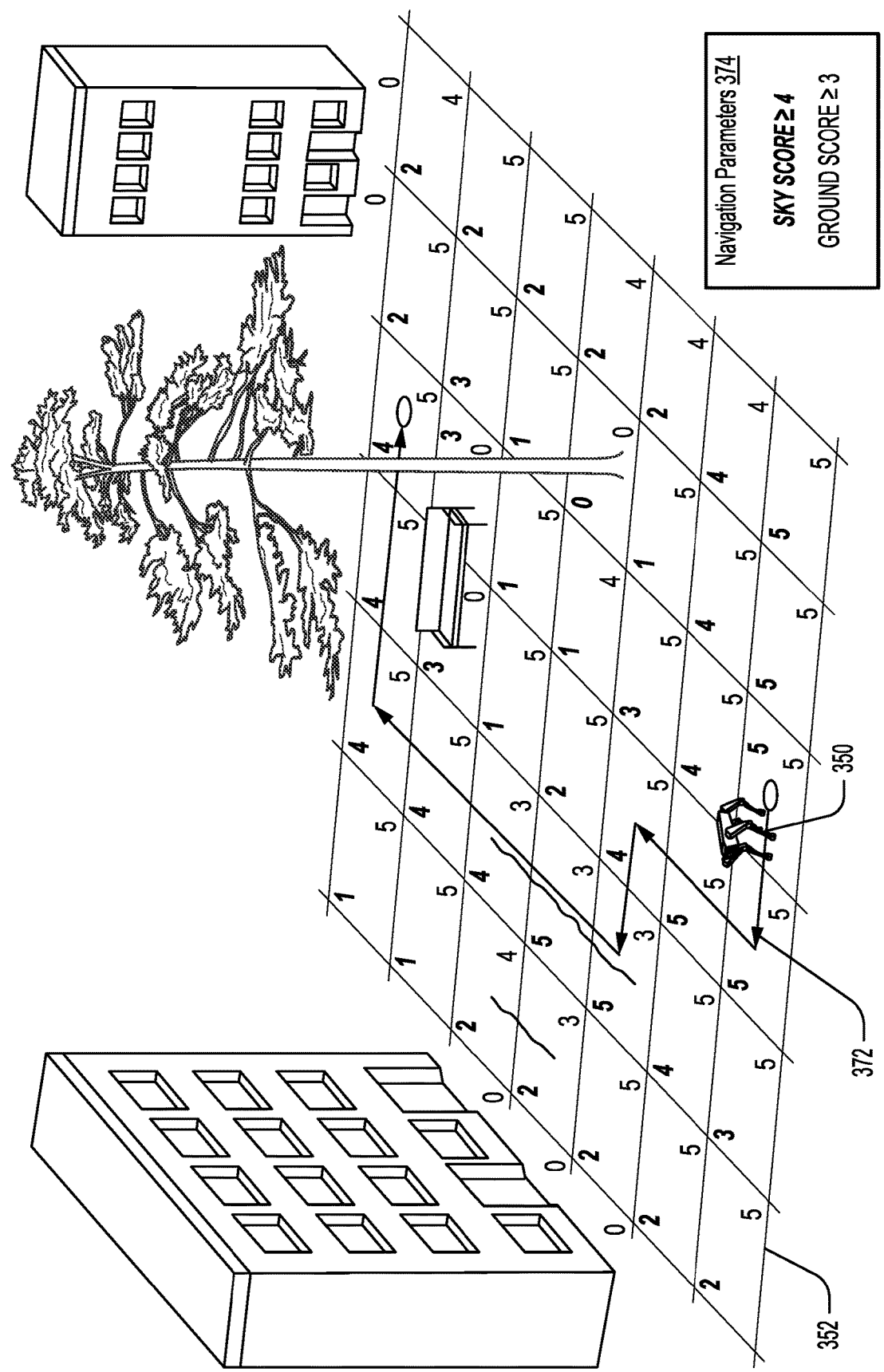
FIG. 3C illustrates an example of a mobile machine navigating between start and destination locations using a navigation map.

FIG. 3C illustrates an additional example of mobile machine 350 navigating between start and destination locations using navigation map 352, in accordance with some embodiments of the present disclosure. Similar to the example of FIG. 3B, in the example of FIG. 3C, navigation map 352 includes a set of sky scores (italicized and bold) and a set of ground scores for a set of ground positions. Navigation parameters 374 specify that mobile machine 350 is to generate path 372 such that path 372 only passes through ground positions with sky scores greater than or equal to 4 and ground scores greater than or equal to 3. As such, path 372 is generated such that it goes around the left side of the bench as shown. Mobile machine 350 is then caused to follow path 372 until arriving at the destination location.

Figure 3D:
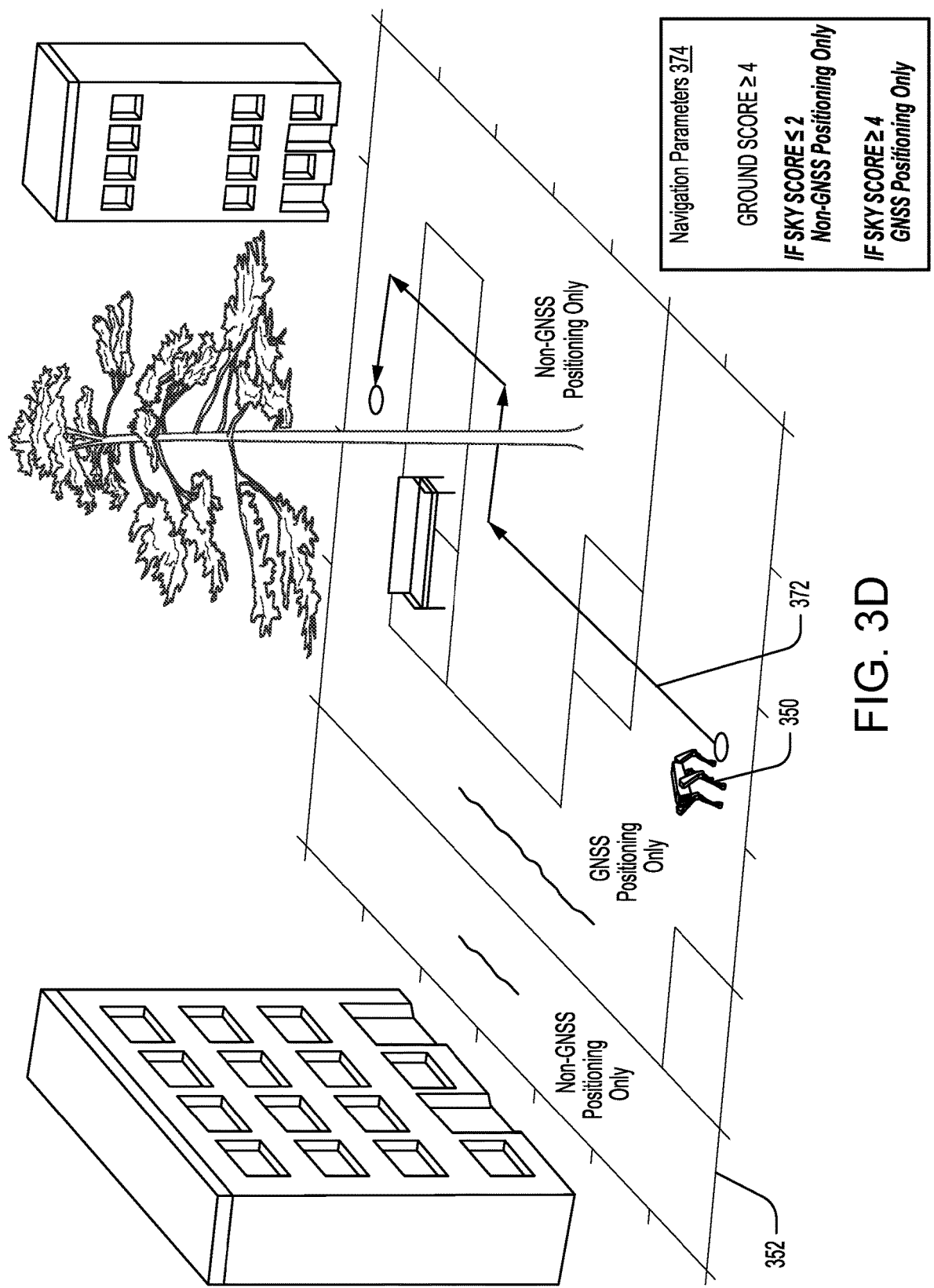
FIG. 3D illustrates an example of a mobile machine navigating between start and destination locations using a navigation map.

FIG. 3D illustrates an additional example of mobile machine 350 navigating between start and destination locations using navigation map 352, in accordance with some embodiments of the present disclosure. While specific sky scores and ground scores are not shown, navigation map 352 in FIG. 3D may be similar to navigation map 352 shown in FIG. 3B or 3C. Navigation parameters 374 specify that mobile machine 350 is to generate path 372 such that path 372 only passes through ground positions with ground scores greater than or equal to 4. Furthermore, navigation parameters 374 specify that, for the purposes of calculating the position of mobile machine 350, only non-GNSS (non-satellite) positioning data is to be used for ground positions with sky scores less than or equal to 2 and only GNSS (satellite) data is to be used for ground positions with sky scores greater than or equal to 4. In some instances, different zones may be created that modify how mobile machine 350 calculates its position as mobile machine 350 passes through the zones while traveling to the destination location.

In the example of FIG. 3D, mobile machine 350 is able to follow the shortest accessible path while properly handling satellite data. In some embodiments, various aspects of the examples described in FIGS. 3A-3D may be combined. For example, in a situation where finding the shortest accessible path is less important, such as the example of FIG. 3C in which path 372 is able to pass through ground positions with sky scores greater than or equal to 4 and ground scores greater than or equal to 3, mobile machine 350 may use sky scores to both generate path 372 as well as to handle how satellite data and non-satellite positioning data are used for calculating the position of mobile machine 350. For example, again in reference to the example of FIG. 3C, satellite data may exclusively be used to calculate the position of mobile machine 350 while at ground positions with sky scores equal to 5 while both satellite data and non-satellite positioning data may be used to calculate the position of mobile machine 350 while at ground positions with sky scores equal to 4. Other possibilities are contemplated.

Figure 4:
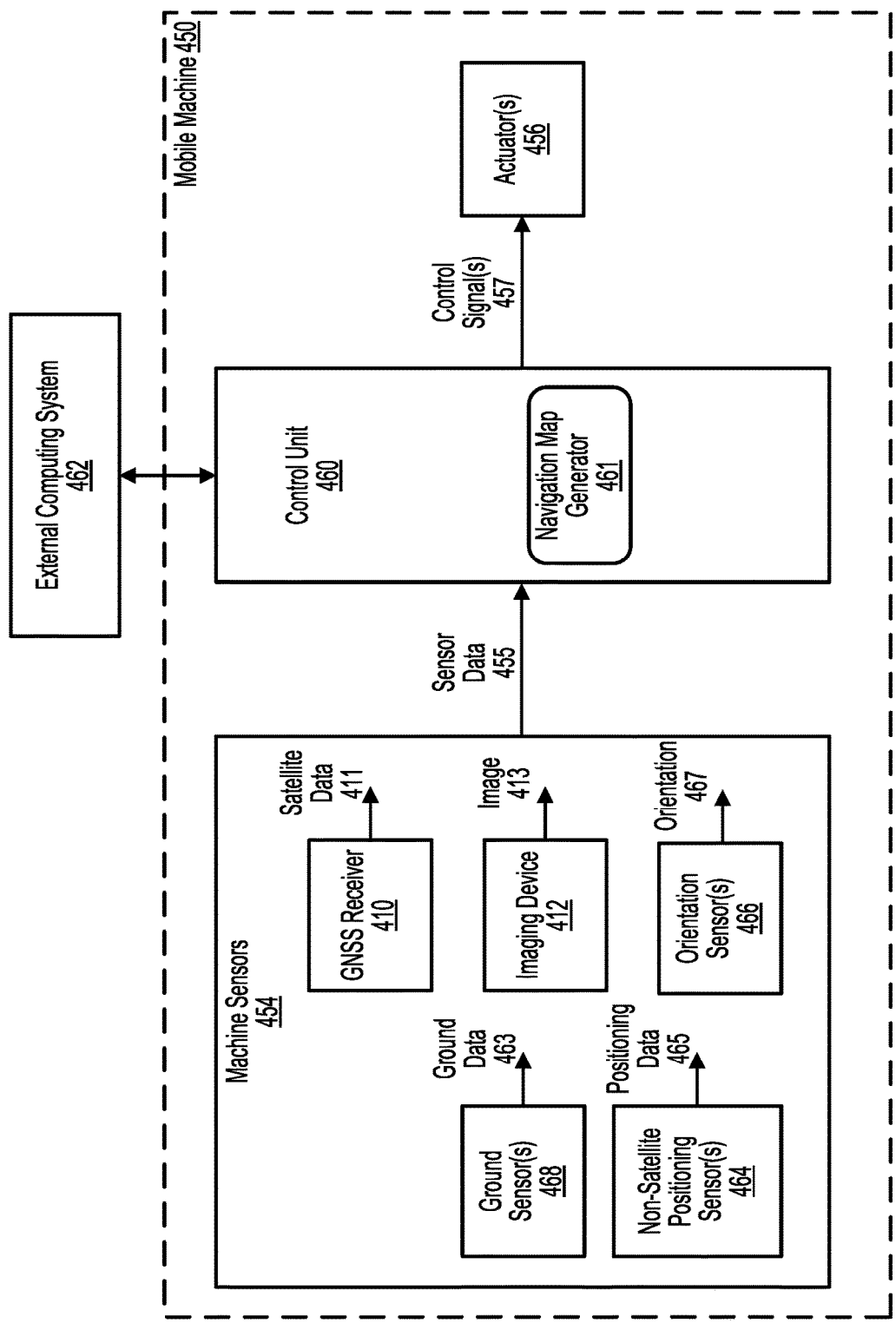
FIG. 4 illustrates an example block diagram of a mobile machine.

FIG. 4 illustrates an example block diagram of a mobile machine 450, in accordance with some embodiments of the present disclosure. Mobile machine 450 may include various machine sensors 454, actuators 456, computing devices, and software/hardware modules for allowing autonomous or non-autonomous operation of mobile machine 450. The components of mobile machine 450 may be communicatively coupled to each other via one or more wired and/or wireless connections.

Mobile machine 450 may include a control unit 460 that receives data from sensors and generates commands that are sent to the various actuators and output devices. In the illustrated example, control unit 460 receives sensor data 455 from machine sensors 454, and generates control signal(s) 457 which are sent to actuator(s) 456. Control unit 460 may include one or more processors and an associated memory. In some embodiments, control unit 460 may be communicatively coupled to an external computing system 462 located external to mobile machine 340. External computing system 462 may send instructions, alerts, or other general information to control unit 460. In some instances, external computing system 462 may provide a destination location and/or navigation parameters to mobile machine 450.

In some embodiments, machine sensors 454 may include a GNSS receiver 410 that may be configured to receive satellite data 411 from one or more satellites. Satellite data 411 may include one or more GNSS signals from which a geospatial position of mobile machine 450 may be computed. In some embodiments, machine sensors 454 may include an imaging device 412 that may be configured to capture an upward-facing image 413. Imaging device 412 may be at least partially oriented toward the one or more satellites.

In some embodiments, machine sensors 454 may include ground sensor(s) 468 that may be configured to capture ground data 463 that may be used to calculate a set of ground scores of the navigation map. Ground sensor(s) 468 may include cameras, depth sensors, acoustic sensors, radar, LiDAR, among other possibilities. In some embodiments, machine sensors 454 may include non-satellite positioning sensor(s) 464 that may be configured to capture positioning data 465 that may be used to calculate the position of mobile machine 450. Non-satellite positioning sensor(s) 464 may include cameras, IMUs, or any type of sensor capable of calculating position that do not rely on satellite signals.

In some embodiments, machine sensors 454 may include orientation sensor(s) 466 that may be configured to capture an orientation 467 of imaging device 412 and/or mobile machine 450. In some examples, orientation sensor(s) 466 may include one or more gyroscopes for detecting angular acceleration, angular rate and/or angular position, one or more accelerometers for detecting linear acceleration, linear velocity, and/or linear position, one or more inertial measurement units (IMUs) which may each include one or more accelerometers, one or more gyroscopes, and/or one or more magnetometers for detecting the above-listed types of data, among other possibilities.

Control unit 460 may include various controllers and modules to assist in the generation of control signal(s) 457. Each of the controllers and modules may include dedicated hardware and/or may be performed using the main processor and/or memory of control unit 460. For example, control unit 460 may include various self-driving or autonomous modules that may make navigation decisions based on sensor data 455. In some embodiments, control unit 460 includes a navigation map generator 461 that generates a navigation map based on sensor data 455. For example, navigation map generator 461 may generate the navigation map based on satellite data 411, image 413, and orientation 467.

Control signal(s) 457 may include direct current (DC) or alternating current (AC) voltage signals, DC or AC current signals, and/or information-containing signals. An example of an information-containing signal may be controller area network (CAN) message that may be sent along a CAN bus or other communication medium. In some instances, control signal(s) 457 include a pneumatic or hydraulic pressure. Upon receiving control signal(s) 457, actuator(s) 456 may be caused to move in a specified manner, such as by extending, retracting, rotating, lifting, or lowering by a specified amount. Actuator(s) 456 may use various forms of power to provide movement to the components of mobile machine 450. For example, actuator(s) 456 may be electric, hydraulic, pneumatic, mechanical, or thermal, among other possibilities.

Figure 5:
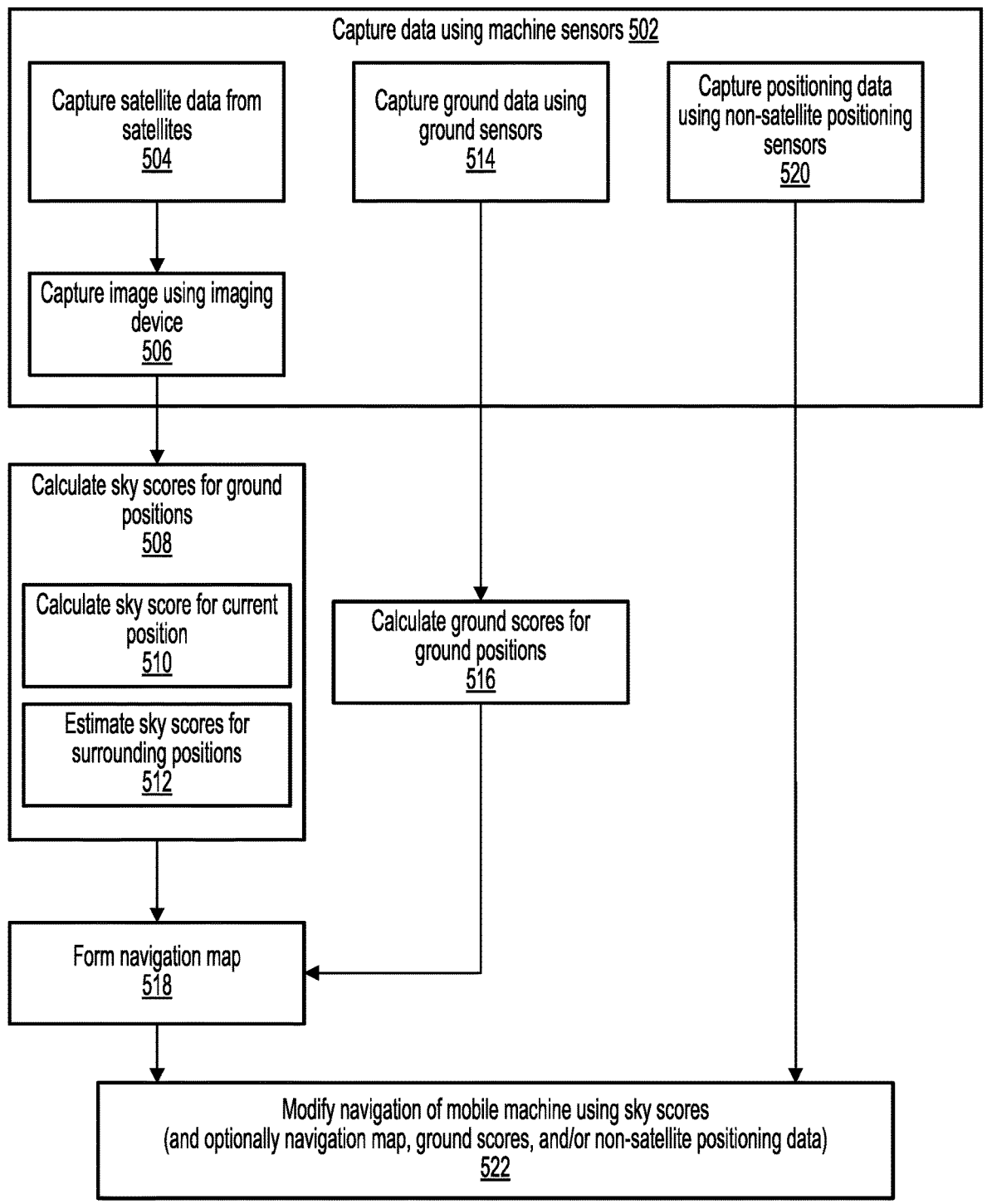
FIG. 5 illustrates an example method of navigating a mobile machine.

FIG. 5 illustrates an example method 500 of navigating a mobile machine, in accordance with some embodiments of the present disclosure. One or more steps of method 500 may be omitted during performance of method 500, and steps of method 500 need not be performed in the order shown. One or more steps of method 500 may be performed by one or more processors. Method 500 may be implemented as a computer-readable medium or computer program product comprising instructions which, when the program is executed by one or more computers, cause the one or more computers to carry out the steps of method 500.

At step 502, sensor data (e.g., sensor data 455) is captured using one or more machine sensors (e.g., machine sensors 454) of a mobile machine (e.g., mobile machines 150, 350, 450).

At step 504, satellite data (e.g., satellite data 411) is captured from one or more satellites (e.g., GNSS satellites 102) using a GNSS receiver (e.g., GNSS receivers 110, 410). The one or more machine sensors may include the GNSS receiver. Capturing the satellite data may include receiving one or more satellite signals (e.g., wireless signals 104) from the one or more satellites.

At step 506, an image (e.g., images 113, 213, 413) is captured using an imaging device (e.g., imaging devices 112, 412). The one or more machine sensors may include the imaging device. The imaging device may be at least partially oriented toward the one or more satellites. The image may be an upward-facing image. The imaging device may be a camera, a depth sensor, among other possibilities.

At step 508, a set of sky scores are calculated for a set of ground positions surrounding the mobile machine based on the satellite data and the image. In some embodiments, each of the set of sky scores may be indicative of an accuracy of a potential (or actual) satellite-based position at the corresponding one of the set of ground positions. In various embodiments, each of the set of sky scores may be calculated using any computation that is mathematically equivalent, scaled or proportional in any way to the example embodiments, or otherwise has an algorithmically useful measure of the imaging device's clear LOS access to the sky. In some embodiments, performing step 508 may include performing one or both of steps 510 and 512.

At step 510, one of the set of sky scores is calculated for a current position of the set of ground positions. The current position may be the position of the mobile machine at the time that step 510 is performed. A method of calculating a sky score is described in reference to method 600 in FIG. 6.

At step 512, one of the set of sky scores is estimated for each of a plurality of surrounding positions of the set of ground positions. A method of calculating (or estimating) a sky score is described in reference to method 600 in FIG. 6.

At step 514, ground data (e.g., ground data 463) is captured using one or more ground sensors (e.g., ground sensor(s) 468) of the mobile machine. The one or more machine sensors may include the one or more ground sensors.

At step 516, a set of ground scores are calculated for the set of ground positions. Each of the set of ground scores may be indicative of an accessibility of the corresponding one of the set of ground positions for the mobile machine.

At step 518, a navigation map (e.g., navigation maps 152, 352) consisting of the set of sky scores and the set of ground scores is formed. The navigation map may be defined over a grid (e.g., the set of ground positions may be distributed over a grid) or over some other spatial distribution, such as over a set of evenly or unevenly spaced set of ground positions. In some embodiments, the set of sky scores may be defined over the same set of ground positions as the set of ground scores or over a different set of ground positions. In some embodiments, the navigation map may include one sky score and one ground score for each point (e.g., ground position) in a grid.

At step 520, positioning data (e.g., positioning data 465) is captured using non-satellite positioning sensors (e.g., non-satellite positioning sensor(s) 464). The one or more machine sensors may include the non-satellite positioning sensors. The non-satellite positioning sensors may include cameras, IMUs, or any type of sensor capable of calculating position that do not rely on satellite signals.

At step 522, a navigation of the mobile machine is modified using the set of sky scores. In some embodiments, the navigation of the mobile machine may be modified further based on the navigation map. In some embodiments, the navigation of the mobile machine may be modified further based on the set of ground scores. In some embodiments, the navigation of the mobile machine may be modified further based on the positioning data.

In some embodiments, modifying the navigation of the mobile machine may include performing any modification to control signals (e.g., control signals 457) sent to actuators (e.g., actuators 356) of the mobile machine based on the set of sky scores and/or the navigation map. In some embodiments, modifying the navigation of the mobile machine may include causing the mobile machine to move toward a higher score from the set of sky scores and away from a lower score from the set of sky scores. For example, the mobile machine may be caused to alter a planned path in order to pass through the higher score and avoid the lower score. In some embodiments, modifying the navigation of the mobile machine may include causing the mobile machine to adjust its positioning algorithm to ignore the satellite data and instead use the positioning data captured by non-satellite positioning sensors when the mobile machine is positioned at a ground position with a corresponding low sky score.

Figure 6:
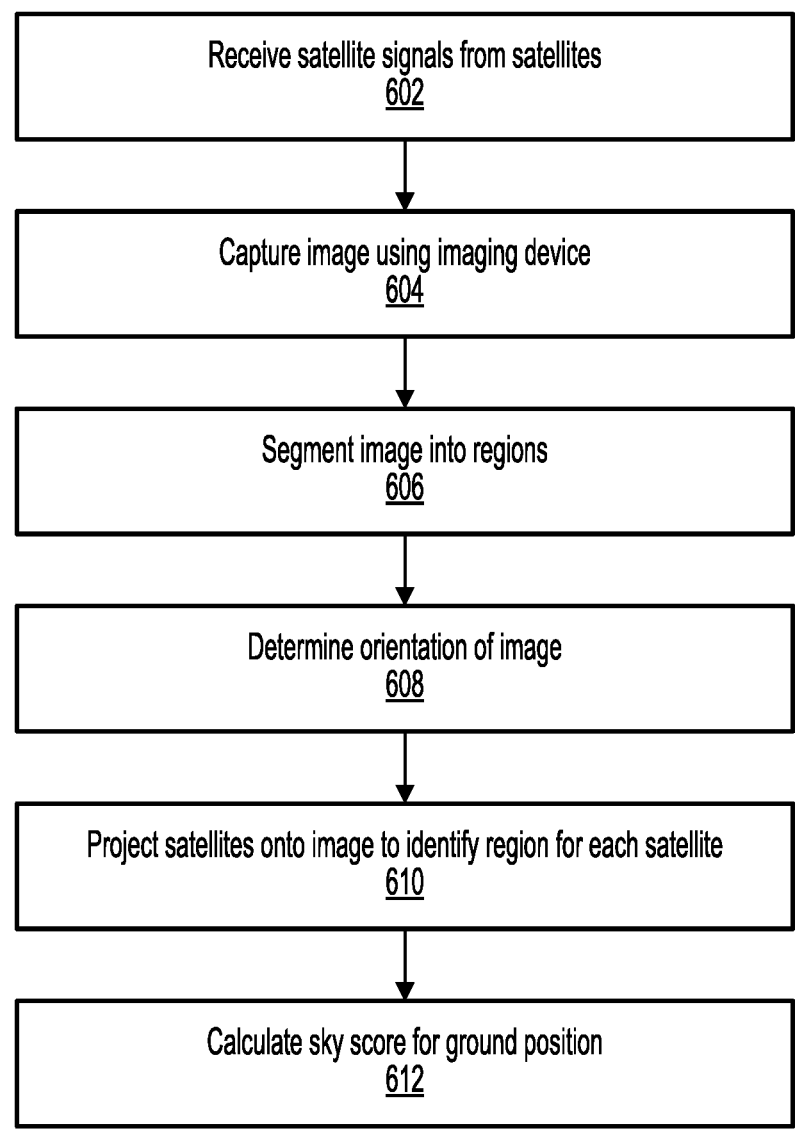
FIG. 6 illustrates an example method of calculating a sky score for a ground position.

FIG. 6 illustrates an example method 600 of calculating a sky score for a ground position, in accordance with some embodiments of the present disclosure. One or more steps of method 600 may be omitted during performance of method 600, and steps of method 600 need not be performed in the order shown. One or more steps of method 600 may be performed by one or more processors. Method 600 may be implemented as a computer-readable medium or computer program product comprising instructions which, when the program is executed by one or more computers, cause the one or more computers to carry out the steps of method 600. One or more steps of method 600 may be used in conjunction with method 500.

At step 602, one or more satellite signals (e.g., wireless signals 104 or satellite data 411) are received from one or more satellites (e.g., GNSS satellites 102) using a GNSS receiver (e.g., GNSS receivers 110, 410) of a mobile machine (e.g., mobile machines 150, 350, 450). Each of the one or more satellite signals may be received from one of the one or more satellites. The one or more satellite signals may be received via a GNSS antenna.

At step 604, an image (e.g., images 113, 213, 413) is captured using an imaging device (e.g., imaging devices 112, 412) of the mobile machine. The imaging device may be at least partially oriented toward the one or more satellites. The image may be an upward-facing image.

The imaging device may be a camera, a depth sensor, among other possibilities. At step 606, the image is segmented into a plurality of regions (e.g., regions 262) based on RF characteristics of objects in the image. Each region of the plurality of regions may be characterized by an extent to which the one or more satellite signals are obstructed by the objects within the region. In one example, the plurality of regions includes a first region having objects that provide little obstruction to satellite signals passing therethrough (e.g., clear sky, clouds), a second region having objects that provide some obstruction to satellite signals passing therethrough (e.g., vegetation, foliage), and a third region having objects that provide significant obstruction to satellite signals passing therethrough (e.g., buildings, mountains).

In some embodiments, the image may be segmented such that each pixel of the image is included in one of the plurality of regions. In some embodiments, certain portions of the image may not be included in any of the plurality of regions. As an example, the process that performs image segmentation may be unable to segment certain portions of the image due to, for example, artifacts in the image, unrecognizable objects in the image, among other possibilities. In some embodiments, the portions of the image that are unable to be segmented directly may be included in the closest region or may be included in a region for unrecognizable objects, among other possibilities.

At step 608, an orientation (e.g., orientation 467) of the image is determined. The orientation of the image may be directly related to (e.g., equal to) the orientation of the imaging device. In some embodiments, the orientation of the imaging device may first be determined and subsequently used to determine the orientation of the image. In some embodiments, the orientation of the image may be determined using satellite data related to the one or more satellite signals. In some embodiments, the orientation of the image may be determined using the image itself. In some embodiments, the orientation of the image may be captured using an orientation sensor (e.g., orientation sensor 466). The orientation sensor may be mounted to the imaging device and/or the mobile machine such that the rotational movement of the orientation sensor is indicative of the rotational movement of the imaging device. The orientation sensor may be an IMU, a gyroscope, a tilt sensor, among other possibilities.

At step 610, the one or more satellites are projected onto the image based on the orientation of the image such that a corresponding region is identified for each of the one or more satellites. In some embodiments, a pixel location within the image is first determined for each of the one or more satellites. The pixel location may be the location within the image at which an orbital position of each of the one or more satellites is aligned or found. The orbital position of each of the one or more satellites may be determined by analyzing satellite data or be obtained through other means (e.g., the orbital positions may be obtained over the internet). In some embodiments, a position of the image may be computed prior to performing step 612 so that the pose of the image may be known. Upon determining the pose, the one or more satellites may be projected onto the image based on both the position and orientation of the image.

At step 612, the sky score is calculated for the ground position based on the projected satellites. If the mobile machine is currently positioned at the ground position, the sky score may be calculated by a formulation that, in some examples, sums the quantity of satellites in the image and weights each satellite in accordance with the corresponding region that was identified for the satellite. For example, in one implementation, the sky score may be calculated by summing the quantity of satellites projected onto the image within a first region (and weighting each with a first weight, such as 1), the quantity of satellites projected onto the image within a second region with a second weighting value (and weighting each with a second weight, such as 0.5), and the quantity of satellites projected onto the image within a third region with a third weighting value (and weighting each with a third weight, such as 0.1).

If the mobile machine is not currently positioned at the ground position, the sky score may be estimated by modeling the environment surrounding the mobile machine and estimating above-described formulation for the ground position. In some instances, the environment may be modeled using multiple images by, for example, estimating the height of objects based on the distance traveled by the mobile machine between the images being captured and the movement of the objects within the images (e.g., number of pixels moved).

Figure 7A:
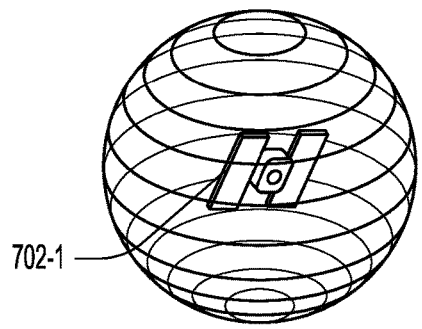
FIG. 7A illustrates a step of an example trilateration technique.
Figure 7B:
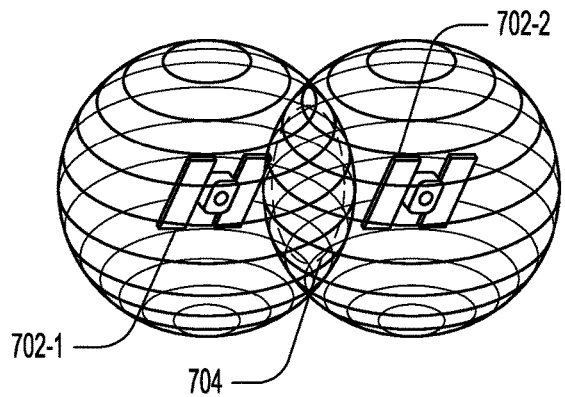
FIG. 7B illustrates a step of an example trilateration technique.

FIGS. 7A-7D illustrate an example trilateration technique performed by a GNSS receiver operating within a GNSS to generate a position estimate, in accordance with some embodiments of the present disclosure. FIG. 7A shows a first scenario in which a GNSS receiver receives GNSS signals from a first satellite 702-1 and generates a distance estimate (e.g., 20,200 km) for that satellite. This informs the GNSS receiver that it is located somewhere on the surface of a (first) sphere with a radius of 20,200 km, centered on first satellite 702-1. FIG. 7B shows a second scenario in which the GNSS receiver receives GNSS signals from a second satellite 702-2 and generates a distance estimate (e.g., 23,000 km) for the additional satellite. This informs the GNSS receiver that it is also located somewhere on the surface of a (second) sphere with a radius of 23,000 km, centered on second satellite 702-2. This limits the possible locations to somewhere on the region 704 where the first sphere and second sphere intersect.

Figure 7C:
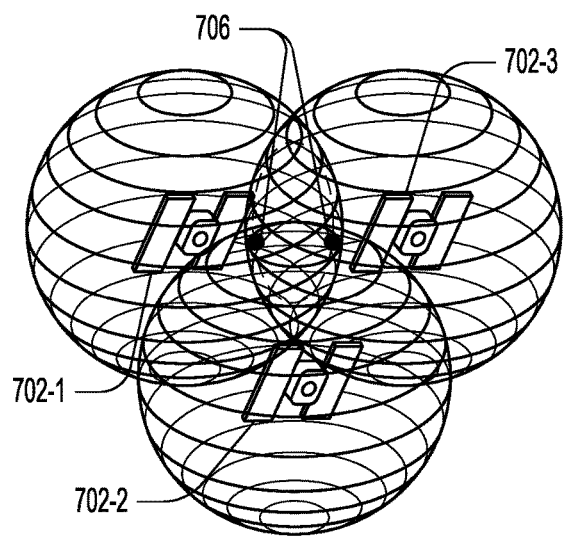
FIG. 7C illustrates a step of an example trilateration technique.
Figure 7D:
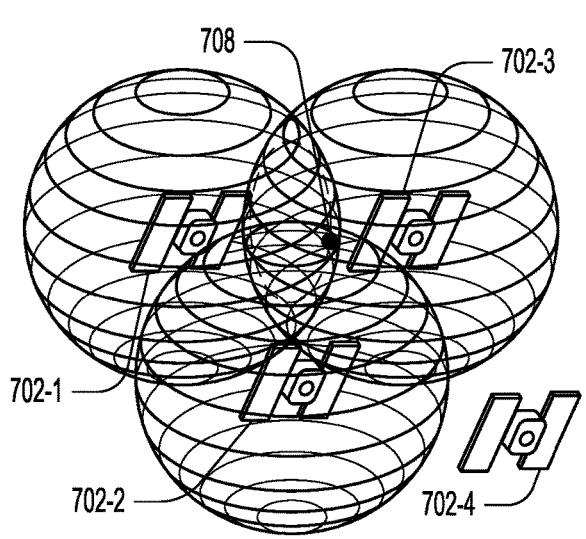
FIG. 7D illustrates a step of an example trilateration technique.

FIG. 7C shows a third scenario in which the GNSS receiver receives GNSS signals from a third satellite 702-3 and generates a distance estimate (e.g., 25,800 km) for the additional satellite. This informs the GNSS receiver that it is also located somewhere on the surface of a (third) sphere with a radius of 25,800 km, centered on third satellite 702-3. This limits the possible locations to two points 706 where the first sphere, the second sphere, and the third sphere intersect. FIG. 7D shows a fourth scenario in which the GNSS receiver receives GNSS signals from a fourth satellite 702-4. Fourth satellite 702-4 can be used to resolve which of points 706 is a correct point 708 (by generating a fourth sphere) and/or to synchronize the receiver's clock with the satellites' time.

Figure 8:
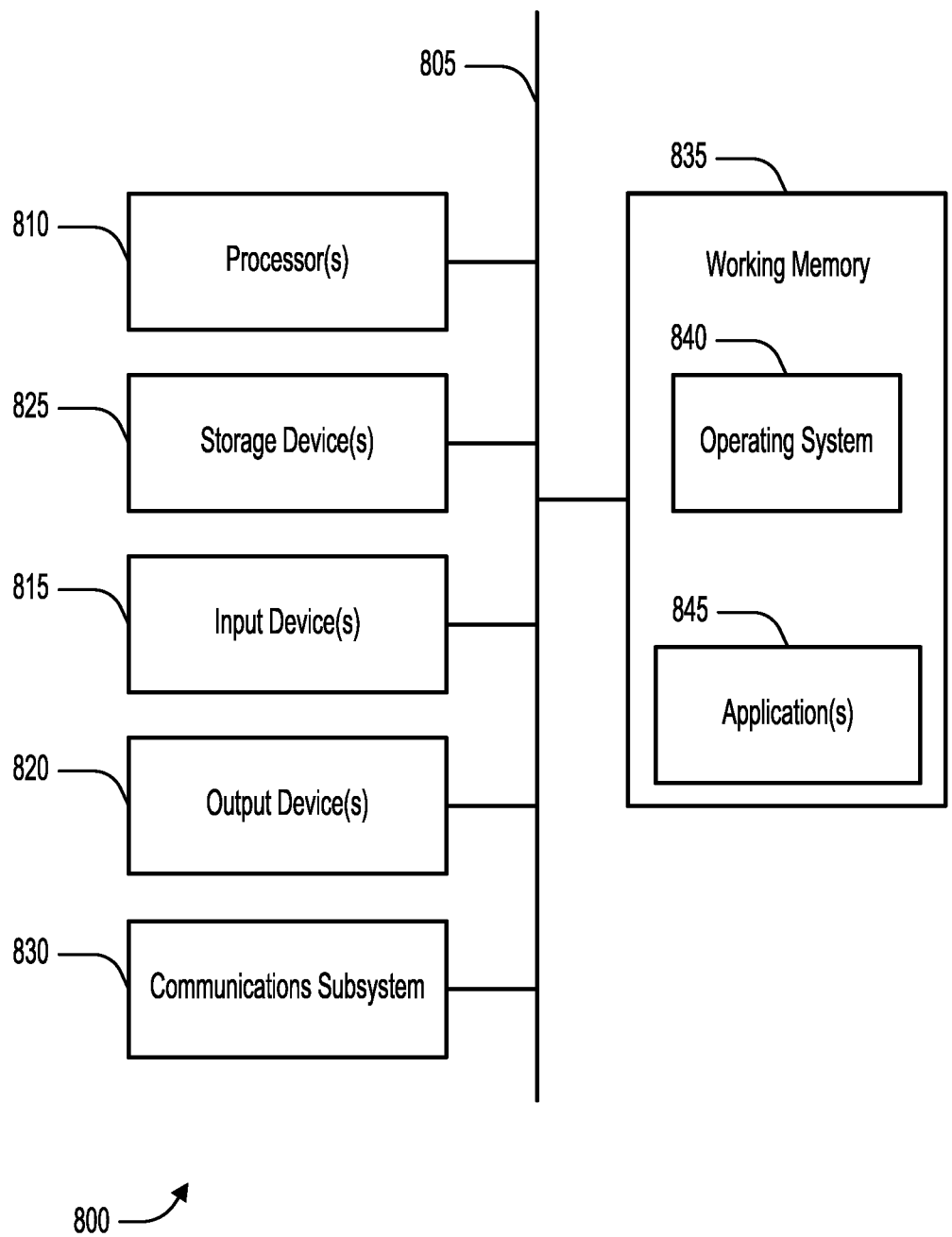
FIG. 8 illustrates a simplified computer system.

FIG. 8 illustrates a simplified computer system 800, in accordance with some embodiments of the present disclosure. FIG. 8 provides a schematic illustration of one embodiment of computer system 800 that can perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or more integrated manner.

Computer system 800 is shown comprising hardware elements that can be electrically coupled via a bus 805, or may otherwise be in communication, as appropriate. The hardware elements may include one or more processors 810, including without limitation one or more general-purpose processors and/or one or more special-purpose processors such as digital signal processing chips, graphics acceleration processors, and/or the like; one or more input devices 815, which can include, without limitation a mouse, a keyboard, a camera, and/or the like; and one or more output devices 820, which can include, without limitation a display device, a printer, and/or the like.

Computer system 800 may further include and/or be in communication with one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 800 might also include a communications subsystem 830, which can include, without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 830 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 830. In other embodiments, a portable electronic device, e.g. the first electronic device, may be incorporated into computer system 800, e.g., an electronic device as an input device 815. In some embodiments, computer system 800 will further comprise a working memory 835, which can include a RAM or ROM device, as described above.

Computer system 800 also can include software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 825 described above. In some cases, the storage medium might be incorporated within a computer system, such as computer system 800. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 800 and/or might take the form of source and/or installable code, which, upon compilation and/or installation on computer system 800 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as computer system 800 to perform methods in accordance with various embodiments of the technology. According to a set of embodiments, some or all of the procedures of such methods are performed by computer system 800 in response to processor 810 executing one or more sequences of one or more instructions, which might be incorporated into the operating system 840 and/or other code, such as an application program 845, contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 800.

The communications subsystem 830 and/or components thereof generally will receive signals, and the bus 805 then might carry the signals and/or the data, instructions, etc. carried by the signals to the working memory 835, from which the processor(s) 810 retrieves and executes the instructions. The instructions received by the working memory 835 may optionally be stored on a non-transitory storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method comprising:
capturing sensor data using one or more machine sensors of a mobile machine, wherein capturing the sensor data includes:
capturing satellite data from one or more satellites; and
capturing an image using an imaging device that is at least partially oriented toward the one or more satellites;
calculating a set of sky scores for a set of ground positions surrounding the mobile machine based on the satellite data and the image, wherein each of the set of sky scores is indicative of an accuracy of a satellite-based position at one of the set of ground positions, and wherein at least one sky score of the set of sky scores is calculated by:
segmenting the image into a plurality of regions based on radio frequency (RF) characteristics of objects in the image, wherein the plurality of regions includes at least three regions corresponding to at least three different amounts of RF obstruction of the objects in the image;
projecting the one or more satellites onto the image; and
calculating the at least one sky score based on the projected one or more satellites; and
modifying a navigation of the mobile machine using the set of sky scores.

2. The method of claim 1, wherein capturing the sensor data includes:
capturing ground data using one or more ground sensors, wherein the one or more machine sensors includes the one or more ground sensors.

3. The method of claim 2, further comprising:
calculating a set of ground scores for the set of ground positions, wherein each of the set of ground scores is indicative of an accessibility of one of the set of ground positions for the mobile machine.

4. The method of claim 3, further comprising:
forming a navigation map consisting of the set of sky scores and the set of ground scores, wherein the navigation is modified using the navigation map.

5. The method of claim 1, wherein each of the set of sky scores is calculated based on a quantity of the one or more satellites that are unobstructed at one of the set of ground positions.

6. The method of claim 1, wherein modifying the navigation of the mobile machine includes:
causing the mobile machine to move toward a first ground position of the set of ground positions having a first score from the set of sky scores and away from a second ground position of the set of ground positions having a second score from the set of sky scores based on the first score being higher than the second score.

7. The method of claim 1, wherein calculating the set of sky scores includes:
calculating one of the set of sky scores for a current position of the set of ground positions; and
estimating one of the set of sky scores for each of a plurality of surrounding positions of the set of ground positions.

8. A system comprising:
one or more processors; and
a computer-readable medium comprising instructions that, when executed by one or more processors, cause the one or more processors to perform operations comprising:
capturing sensor data using one or more machine sensors of a mobile machine, wherein capturing the sensor data includes:
capturing satellite data from one or more satellites; and
capturing an image using an imaging device that is at least partially oriented toward the one or more satellites;
calculating a set of sky scores for a set of ground positions surrounding the mobile machine based on the satellite data and the image, wherein each of the set of sky scores is indicative of an accuracy of a satellite-based position at one of the set of ground positions, and wherein at least one sky score of the set of sky scores is calculated by:
segmenting the image into a plurality of regions based on radio frequency (RF) characteristics of objects in the image, wherein the plurality of regions includes at least three regions corresponding to at least three different amounts of RF obstruction of the objects in the image;
projecting the one or more satellites onto the image; and
calculating the at least one sky score based on the projected one or more satellites; and
modifying a navigation of the mobile machine using the set of sky scores.

9. The system of claim 8, wherein capturing the sensor data includes:
capturing ground data using one or more ground sensors, wherein the one or more machine sensors includes the one or more ground sensors.

10. The system of claim 9, wherein the operations further comprise:
calculating a set of ground scores for the set of ground positions, wherein each of the set of ground scores is indicative of an accessibility of one of the set of ground positions for the mobile machine.

11. The system of claim 10, wherein the operations further comprise:
forming a navigation map consisting of the set of sky scores and the set of ground scores, wherein the navigation is modified using the navigation map.

12. The system of claim 8, wherein each of the set of sky scores is calculated based on a quantity of the one or more satellites that are unobstructed at one of the set of ground positions.

13. The system of claim 8, wherein modifying the navigation of the mobile machine includes:
causing the mobile machine to move toward a first ground position of the set of ground positions having a first score from the set of sky scores and away from a second ground position of the set of ground positions having a second score from the set of sky scores based on the first score being higher than the second score.

14. The system of claim 8, wherein calculating the set of sky scores includes:
- calculating one of the set of sky scores for a current position of the set of ground positions; and
- estimating one of the set of sky scores for each of a plurality of surrounding positions of the set of ground positions.

15. A non-transitory computer-readable medium comprising instructions that, when executed by one or more processors, cause the one or more processors to perform operations comprising:
- capturing sensor data using one or more machine sensors of a mobile machine, wherein capturing the sensor data includes:
  - capturing satellite data from one or more satellites; and
  - capturing an image using an imaging device that is at least partially oriented toward the one or more satellites;
- calculating a set of sky scores for a set of ground positions surrounding the mobile machine based on the satellite data and the image, wherein each of the set of sky scores is indicative of an accuracy of a satellite-based position at one of the set of ground positions, and wherein at least one sky score of the set of sky scores is calculated by:
  - segmenting the image into a plurality of regions based on radio frequency (RF) characteristics of objects in the image, wherein the plurality of regions includes at least three regions corresponding to at least three different amounts of RF obstruction of the objects in the image;
  - projecting the one or more satellites onto the image; and
  - calculating the at least one sky score based on the projected one or more satellites; and
- modifying a navigation of the mobile machine using the set of sky scores.

16. The non-transitory computer-readable medium of claim 15, wherein capturing the sensor data includes:
- capturing ground data using one or more ground sensors, wherein the one or more machine sensors includes the one or more ground sensors.

17. The non-transitory computer-readable medium of claim 16, wherein the operations further comprise:
- calculating a set of ground scores for the set of ground positions, wherein each of the set of ground scores is indicative of an accessibility of one of the set of ground positions for the mobile machine.

18. The non-transitory computer-readable medium of claim 15, wherein modifying the navigation of the mobile machine includes:
- causing the mobile machine to move toward a first ground position of the set of ground positions having a first score from the set of sky scores and away from a second ground position of the set of ground positions having a second score from the set of sky scores based on the first score being higher than the second score.

* * * * *